United States Patent
Weeks

(10) Patent No.: US 7,823,005 B2
(45) Date of Patent: Oct. 26, 2010

(54) COMMUNICATIONS SYSTEM

(75) Inventor: Robert Weeks, Warwickshire (GB)

(73) Assignee: Ericsson AB, Stockholm (SE)

( * ) Notice: Subject to any disclaimer, the term of this patent is extended or adjusted under 35 U.S.C. 154(b) by 707 days.

(21) Appl. No.: 11/574,541

(22) PCT Filed: Aug. 30, 2005

(86) PCT No.: PCT/EP2005/054251

§ 371 (c)(1),
(2), (4) Date: Jul. 25, 2007

(87) PCT Pub. No.: WO2006/024636

PCT Pub. Date: Mar. 9, 2006

(65) Prior Publication Data

US 2008/0130638 A1    Jun. 5, 2008

(30) Foreign Application Priority Data

Sep. 3, 2004    (GB) .................... 0419492.4

(51) Int. Cl.
G06F 11/00    (2006.01)
(52) U.S. Cl. ................. 714/4; 714/35; 714/43; 370/398
(58) Field of Classification Search ............... 714/4, 714/35, 43; 370/389
See application file for complete search history.

(56) References Cited

U.S. PATENT DOCUMENTS

| 5,481,735 | A | * | 1/1996 | Mortensen et al. | 709/246 |
|---|---|---|---|---|---|
| 5,524,116 | A | * | 6/1996 | Kalmanek et al. | 714/799 |
| 5,675,579 | A | * | 10/1997 | Watson et al. | 370/248 |
| 5,884,103 | A | * | 3/1999 | Terho et al. | 710/72 |
| 6,442,141 | B1 | | 8/2002 | Borella et al. | |
| 7,006,611 | B2 | * | 2/2006 | Bonn et al. | 379/93.31 |
| 7,389,540 | B2 | * | 6/2008 | Radatti et al. | 726/24 |
| 2002/0059479 | A1 | * | 5/2002 | Hardy et al. | 710/1 |
| 2003/0083013 | A1 | * | 5/2003 | Mowery et al. | 455/41 |
| 2004/0127212 | A1 | | 7/2004 | Wang | |

FOREIGN PATENT DOCUMENTS

| EP | 0439986 A1 | 8/1991 |
|---|---|---|
| EP | 1434386 | 6/2004 |
| GB | 2353119 | 2/2001 |
| GP | 1398961 | 6/1975 |
| WO | 99/01819 | 1/1999 |

* cited by examiner

Primary Examiner—Philip Guyton
(74) Attorney, Agent, or Firm—Coats & Bennett, P.L.L.C.

(57) ABSTRACT

A method for the monitoring and modification of communications in a communications system and a related communications system with a number of intercommunicating first nodes in which the intercommunication comprises desired communications and may comprise undesired communications; in which the system also comprises a further node for monitoring and modifying the communications; in which the further node comprises means for modifying the undesired communications and/or introducing further communications to change the operation of the system.

21 Claims, 2 Drawing Sheets

COMMUNICATIONS SYSTEM

The present invention is directed towards the field of communications systems in general and to the monitoring and modification of communications in such systems in particular.

Integrating two computer systems commonly involves a step-wise approach to testing and debugging communications between the computers. The same is true to the process of introducing change, for example for the purposes of upgrade, into a previously integrated computer system. The communication is allowed to proceed until one end reports an anomaly: the communication is then validated to determine which system is operating correctly and which system is at fault. A re-work cycle is then commenced on the incorrect system to fix the problem, and when a new release is available, the integration is restarted. Unfortunately, restarting the integration may only take the communication one or two messages further before another problem is identified. This loop continues until the systems are satisfactorily integrated; however this may take many iterations and consequently be very expensive in time and effort.

Due to the ever-increasing sophistication of communications equipment, the level of intelligence once restricted to stand-alone computers now finds its way into everyday communications equipment including switches, routers, terminals and even telephones. The use here of the term "computer systems" will be understood to include all such equipment.

Today's computer systems may be developed by disparate teams working in different locations and often for different organisations, all having different priorities. The scale of the systems may also vary greatly. An embedded system running on specialised hardware, for example in an intelligent telephone, may have software in unmodifiable, i.e. un-reprogrammable storage that requires replacement of the storage device in order to modify the software. A complex application running on several computer servers distributed over a local or wide area communication network may require complex operations to achieve even a minor software update. As a result, systems integration becomes more complicated and the rework time (which can be many weeks) becomes a major bottleneck in the integration process.

The present invention has as an object a reduction in the time and effort required to achieve a desired operation in such systems.

The present invention provides a method for monitoring and modifying communications between at least two first nodes in which the communications comprises at least one of communications of a first set relating to a desired operation of the system and communications of a second set relating to an undesired operation of the system including the steps of introducing a further node into the system, using the further node to detect the communications and using the further node to do at least one of modifying the communications of the second set and introducing communications of a third set relating to a different operation of the system.

The present invention also provides a communications system comprising at least two first nodes arranged for intercommunication in which the intercommunication comprises at least one of communications of a first set relating to a desired operation of the system and communications of a second set relating to an undesired operation of the system; in which the system also comprises a further node for monitoring and modifying the communications; in which the further node comprises monitoring means for monitoring the communications and means for at least one of modifying the communications of the second set and introducing communications of a third set relating to a different operation of the system.

The present invention also provides a communications system comprising a network comprising at least two first nodes arranged for intercommunication through the network in which the at least two first nodes comprise control information for causing the nodes to communicate according to at least one of a desired operation of the system and a different operation of the system in which the system comprises a further node disconnected from the network for connecting to the network for monitoring and modifying the intercommunications when so connected, in which the control information is based, at least in part on information gathered by the further node when connected to the network.

Embodiments of the present invention will now be described, by way of example, with reference to the drawings in which.

The following terms are defined:

exceptional communications include errors in signalling or message formats or corrupted message contents;

modifying an exceptional communication includes changing one or more of the signalling, message content and message format sent by a first node so as to change the way in which the intended recipient node responds to the receipt of the communication, for example so that the intended recipient node does not detect an error but continues with normal processing.

Figure 1:
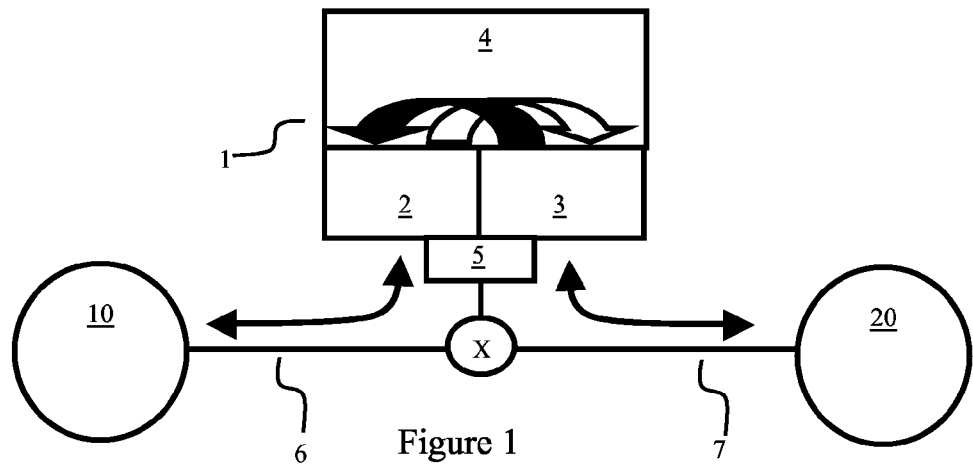
FIGS. 1 and 2 show communications systems with intermediate node according to the present invention.

To increase the efficiency of the systems-integration or change process and to reduce the number of reworks necessary, an integration unit according to the present invention is introduced into a system subject to integration or change. In the following, reference to "integration" will be taken to include "change". Referring to FIG. 1, for example, integration unit 1 is introduced between two pieces of equipment or devices under test 10, 20 to which it connects via communications link 6 and 7, respectively and intermediate node X. Communications links 6, 7 may be optical, wireless or electrical in nature comprising typically optical fibre, free space or electrical conductors, e.g. copper wire, possibly in a coaxial arrangement. The invention is not restricted to one type of network but applies to communications over physical networks operating a number of different communications protocols, such as Ethernet, Asynchronous Transfer Mode (ATM), Synchronous Digital Hierarchy (SDH) or Multi-Protocol Label Switching (MPLS), also networks running packet layer protocol such as Internet Protocol (IP), using a message-based or streaming transport protocol such as UDP, TCP or SCTP, and comprising applications protocols such as Media Gateway Control Protocol (MGCP), H.248, or Session Initiation Protocol (SIP). According to a preferred embodiment, integration unit 1 may run on off-the-shelf hardware, such as a personal computer system running a general-purpose operating system such as Windows or Linux (Windows and Linux are registered trademarks of the Microsoft Corporation and the Linux Mark Institute, respectively). Each of the devices under test 10, 20 is unaware of the introduction of the integration unit that effectively forwards or emulates the communications from the other piece or pieces of equipment under test, as required.

Integration unit 1 comprises logical interfaces 2 and 3, processing function 4 and physical interface 5. The integration unit 1 connects into the communications link 6, 7 between devices 10, 20 at intermediate node X. Physical interface 5 acts to convert the physical (electrical/optical/electromagnetic) characteristics of messages exchanged between devices 10, for input to logical interfaces 2, 3 and to convert the physical characteristics of messages generated or processed by the integration unit for sending out over communications link 6 or 7 to device 10 or 20. Processing function 4 runs a specialised intermediary application. In normal operation, devices 10 and 20 are reconfigured to send messages to 1 by, for example, changing the IP addresses of messages sent. X comprises a switching device appropriate to the type of network and, in the case of an Ethernet-based network may, according to a preferred embodiment, be an Ethernet Switch. According to this embodiment, the intermediary application "listens" on a specific port number (or "socket") for messages. When a message is received at integration unit 1 from device 10, the intermediary application analyses the message, and may modify the message before it passes it on to device 20. Similarly, when a message is received from device 20, the intermediate application analyses the message and may modify the message before passing it on to device 10. Initially, all messages are simply passed on by the integration unit 1 without modification. If a problem is identified in the communications between devices 10 and 20, then instead of halting the test to rework device 10 or 20, as appropriate, the integration unit is adapted to modify the communications sent to one or more of the pieces of equipment to achieve the desired operation. This may involve halting the test temporarily unless, for example, an anticipated state of affairs is encountered in which a predetermined correction may be implemented without disrupting the test process. Otherwise any interruption of the tests will be much shorter than the time that would be required to implement a rework of one or more of the devices under test.

The intermediary system of integration unit 1 may, by way of example, comprise control software arranged as follows:

```
For ever
do
    wait for message
    if message from 10
        cheek modification list for messages from 10
        if modification required
            do modification
        forward (possibly modified) message to 20
    if message from 20
        check modification list for messages from 20
        if modification required
            do modification
        forward (possibly modified) message to 10.
```

The need for modifying a message received at integration unit 1 may, according to a further embodiment, be identified by examining each message in a particular direction for a certain sequence of data. Corrective action may then be taken by replacing this data sequence with different data. Problems may also be identified by looking for certain message sequences. In some protocols, the messages may be text-based, allowing for simple manipulation, whilst in others the messages may be binary encoded, requiring more detailed interpretation and manipulation of the data. Alternatively, the integration unit 1 may respond on behalf of one of the devices 10, 20 with a new message and without passing on the original message at all. Multiple translations within a single message and a combination of actions may be required in order to overcome more complex problems.

With a general-purpose computer system acting as the integration unit, the intermediary application can quickly be changed, as necessary, to cater for newly detected problems or the integration of newly required features requiring new message manipulations.

The present invention advantageously allows a faulty system to be quickly "patched" to allow testing to continue without the long delays associated with reworking one or other of the devices under test.

Once all the necessary modifications have been identified using the integration unit, i.e. so that the desired error-free operation has been achieved between the devices under test, information on the modifications can be consolidated and provided to the, often separate, teams of developers for incorporation in the applications run by the various devices under test. This can be done with a high degree of confidence that, following correct rework of the applications based on the comprehensive information provided by the integration unit, the devices will inter-work correctly without the integration unit.

Figure 2:
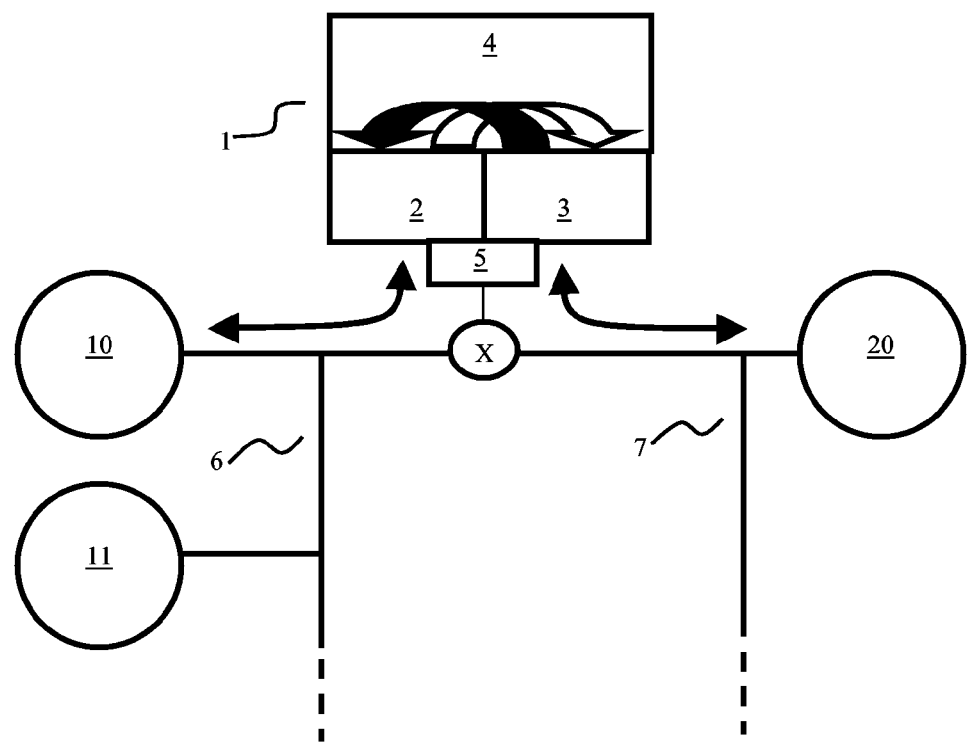

Application of the present invention to a system with more than two devices under test will now be described with reference to FIG. 2. Major components common to FIGS. 1 and 2 are given identical reference numerals and will not be described further here. In FIG. 2, communication link 6 is extended to additional device under test 11. Device 11 is effectively connected in parallel with device 10, referred to above in relation to FIG. 1. Communications between devices 10 and 11 that do not pass via intermediary node X will not be monitored or modified by integration unit 1. Communications between devices 10 or 11 and device 20 will pass via intermediary node X and will be monitored and modified, as appropriate, by integration unit 1. In a similar manner, additional devices under test (not shown) may be added to communication link 7 in parallel with device 20.

Figure 3:
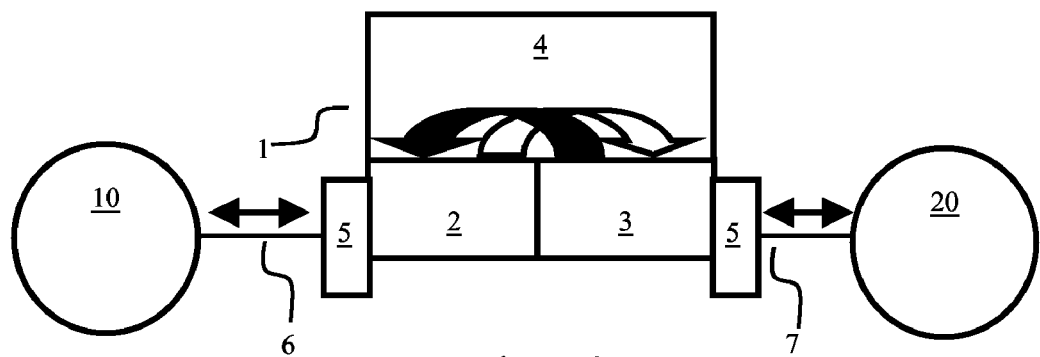
FIGS. 3 and 4 show communications systems with series connection according to the present invention.

FIG. 3 illustrates a further embodiment of the present invention in which integration unit 1 is positioned in series with devices under test 10, 20. Major components common to FIGS. 1 and 3 are given identical reference numerals and will not be described further here. Unlike the arrangement of FIGS. 1 and 2, the embodiment of FIG. 3 has two physical interfaces 5, one connecting to communications link 6 and dedicated to communicating with device under test 10, the other connecting to communications link 7 and dedicated to communicating with device under test 20. In the arrangement of FIG. 3, there is no requirement for an intermediary node as all communications between devices 10 and 20 have to pass via integration unit 1. The major difference in operation is that, in the arrangement of FIG. 3, devices 10 and 20 need not be reconfigured to address messages to integration unit 1. All communications between devices 10 and 20 are in intercepted so that the processing function 4 will see all such communications and may block, modify or otherwise process any part of the communications as required.

Figure 4:
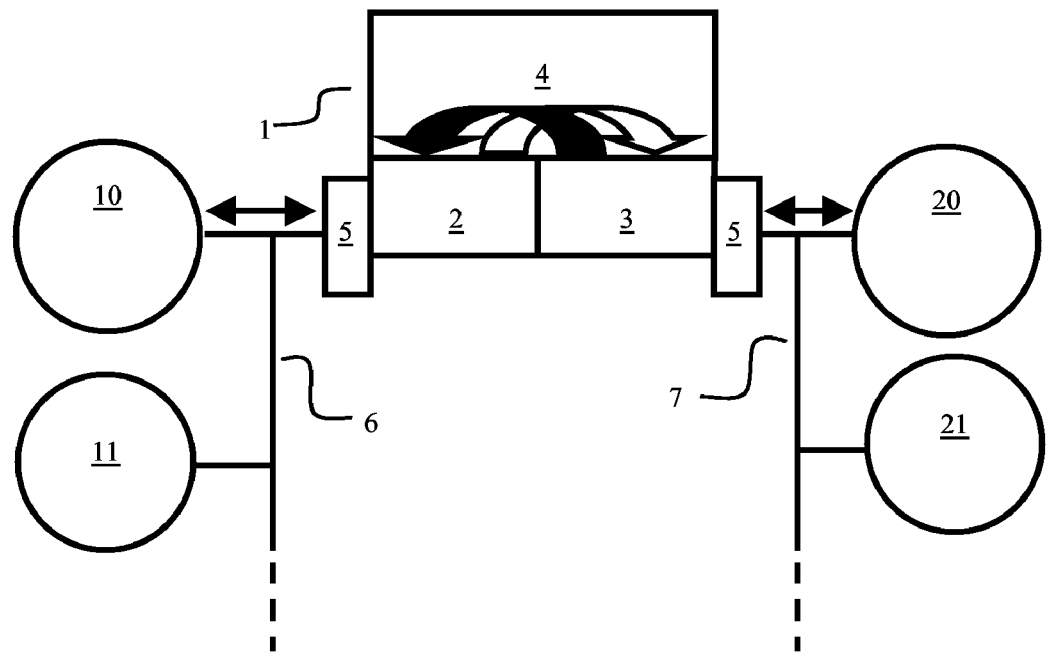

Application of the embodiment of FIG. 3 to a system with more than two devices under test will now be described with reference to FIG. 4. Major components common to FIGS. 3 and 4 are given identical reference numerals and will not be described further here. In FIG. 4, communication link 6 is extended to additional device under test 11 and communication link 7 is extended to additional device under test 21. Device 11 is effectively connected in parallel with device 10. Communications between devices 10 and 11 that do not pass via integration unit 1 will not be monitored or modified by it. Similarly, communications between devices 20 and 21 that do not pass via integration unit 1 will not be monitored or modified by it. Communications between devices 10 or 11 and devices 20 or 21 will pass via integration unit 1 and will be monitored and modified there, as appropriate, to achieve the desired operation of the system. The integration unit 1 of the present invention is not limited to processing a particular type of exceptional communication. The following corrective actions are given by way of example and are illustrative of possible applications of the present invention. Starting with more simple actions:

Change a protocol version string to match that generated by a telephone.

Change a value of a message parameter from a range to a fixed parameter.

Change a list of CODECs to force operation in one or more specific CODECs—e.g. to force voice compression.

Change an IP address in the session description protocol to enable operation through a residential or other firewall or router (not shown) implementing Network Address Translation. This firewall or router typically located adjacent to one of device 10 or 20.

Change a ring-type indicator to generate different ring tones for different calls.

Change the format of a Calling Line Identity parameter so that the phone displays it in a different format.

Change a packetisation interval.

Change an endpoint ID from a numeric dotted notation to textual, and vice versa.

More complicated possible actions include:

Change the mode of a connection from receive-only to send-and-receive to allow prototype operation through a firewall.

Add XML command parameters into commands to a phone to force use of its LCD display and interception of responses.

The present invention advantageously provides for the efficient developing, proving and refining of communications between separate computer systems including servers (including IP telephony call agents), switches, routers, telephones (including IP telephones) or other types of node in a communications system such as a residential gateway, integrated access device or an access gateway. In addition, an otherwise non-functional communications system can be brought into service by the addition of an integration unit according to the present invention. It will be understood that the present invention is not limited to any of the specific embodiments described above that are given by way of example only. It will also be appreciated that modifications may be introduced by the skilled worker to adapt the present invention to specific applications and developments in communications protocols without departing from the scope of the invention. For example, the invention is not limited to integration of two devices but may equally be applied to case where three or more devices are communicating, e.g. in a network.

The invention claimed is:

1. A method of communicating between two or more nodes in a communication system, the method comprising:

communicating messages from a first node to a second node via an integration unit, wherein a first set of messages includes information associated with causing a desired operation of the communication system, and wherein a second set of messages includes information associated with causing an undesired operation of the communication system;

detecting the first and second set of messages at the integration unit;

modifying the second set of messages at the integration unit to include information associated with causing a desired operation of the communication system; and replacing an IP address indicating the first node with an IP address of an intermediate node that communicatively interconnects the first node, the second node, and the integration unit.

2. The method of claim 1 wherein modifying the second set of messages at the integration unit comprises replacing the second set of messages with a third set of messages that include information associated with causing a desired operation of the communication system.

3. The method of claim 1 wherein modifying the second set of messages at the integration unit comprises modifying at least a portion of the second set of messages to appear to the second node as messages from the first set of messages.

4. The method of claim 1 wherein modifying the second set of messages at the integration unit comprises preventing the second node from receiving at least a portion of the second set of messages.

5. The method of claim 1 wherein modifying the second set of messages at the integration unit comprises simulating the operation of the first node by generating at least a portion of the information used to modify the second set of messages.

6. The method of claim 1 wherein modifying the second set of messages at the integration unit comprises simulating the operation of the first node by generating messages of the first set of messages.

7. The method of claim 1 further comprising forwarding the first set of messages from the integration unit to the second node as the first set of messages was received by the integration unit.

8. The method of claim 1 further comprising recording the modifications made to the second set of messages.

9. The method of claim 8 further comprising preventing the first node from generating additional messages that include information associated with causing an undesired operation of the communication system based on the recorded modifications.

10. The method of claim 8 further comprising configuring the first node to generate additional messages to include information associated with causing a desired operation of the communication system based on the recorded modifications.

11. The method of claim 8 further comprising:

communicatively disconnecting the integration unit from the communication path; and communicating additional messages between the first and second nodes such that the additional messages are generated based on the recorded modifications.

12. A communication system comprising:

a first node configured to communicate messages with a second node, wherein a first set of messages includes information associated with causing a desired operation of the communication system, and a second set of messages set includes information associated with causing an undesired operation of the communication system;

an integration unit disposed along the communication path between the first and second nodes, and comprising:

a processing function configured to:

monitor the messages being communicated between the first and second nodes;

modify the second set of messages to include information associated with causing a desired operation of the communication system; and replace an IP address indicating the first node with an IP address of an intermediate node that communicatively interconnects the first node, the second node, and the integration unit.

13. The communication system of claim 12 wherein the processing function is configured to modify the second set of messages by replacing the second set of messages with a third set of messages having information associated with causing a desired operation of the communication system.

14. The communication system of claim 12 in which the processing function is configured to modify at least a portion of the second set of messages to appear to the second node as messages from the first set of messages.

15. The communication system of claim 12 wherein the processing function is further configured to prevent at least one message from the second set of messages from being received at the second node.

16. The communication system of claim 12 wherein the processing function is further configured to simulate the operation of the first node by generating messages from the first set of messages.

17. The communications system of 12 wherein the processing function is further configured to forward messages from the first message set to the second node as those messages are received at the integration unit.

18. The communication system of claim 12 wherein the processing function is configured to record the modifications made to the second set of messages.

19. The communication system of claim 18 wherein the processing function is configured to prevent the first node from generating messages having information associated with causing an undesired operation of the communication system based on the recorded modifications.

20. The communication system of claim 18 wherein the processing function configures the first node to generate messages having information associated with causing a desired operation of the communication system based on the recorded modifications.

21. A communications system comprising:
- a communication network comprising a first node and a second node;
- a communication link interconnecting the first and second nodes to carry control information between the first and second nodes, wherein the control information controls at least one of the first and second nodes to perform at least one of a first function and a second function;
- an integration unit configured to be removably coupled to the communication link to interconnect the first and second nodes, the integration unit configured to:
  - monitor the control information being communicated between the first and second nodes; and
  - modify the control information based at least in part on information gathered by the integration unit when it is coupled to the first and second nodes; and
  - replace an IP address indicating the first node with an IP address of an intermediate node that communicatively interconnects the first node, the second node, and the integration unit.

* * * * *

UNITED STATES PATENT AND TRADEMARK OFFICE
CERTIFICATE OF CORRECTION

| | | |
|---|---|---|
| PATENT NO. | : 7,823,005 B2 | |
| APPLICATION NO. | : 11/574541 | |
| DATED | : October 26, 2010 | |
| INVENTOR(S) | : Weeks | |

It is certified that error appears in the above-identified patent and that said Letters Patent is hereby corrected as shown below:

In Column 3, Line 3, delete "10," and insert -- 10, 20 --, therefor.

In Column 3, Line 42, delete "cheek" and insert -- check --, therefor.

In Column 7, Line 16, in Claim 17, delete "communications system of 12" and insert -- communication system of claim 12 --, therefor.

Signed and Sealed this
Eighteenth Day of October, 2011

David J. Kappos
*Director of the United States Patent and Trademark Office*